United States Patent
Jacob et al.

Patent Number: 5,978,011
Date of Patent: Nov. 2, 1999

[54] PRINTER COLOR GAMUT OPTIMIZATION METHOD

[75] Inventors: Steve A. Jacob; David A. Johnson, both of Boise, Id.

[73] Assignee: Hewlett-Packard Company, Palo Alto, Calif.

[21] Appl. No.: 09/030,637

[22] Filed: Feb. 25, 1998

[51] Int. Cl.$^6$ .................................................... G03F 3/08
[52] U.S. Cl. .......................... 347/251; 347/240; 358/520; 358/523; 358/525
[58] Field of Search .............................. 347/43, 240, 251; 358/502, 518, 520, 523, 529, 525, 534; 382/162, 167; 395/109

*Primary Examiner*—N. Le
*Assistant Examiner*—Hai C. Pham

[57] ABSTRACT

The method of the invention provides an improved method for converting primary printer color values to combinations of the primary printer color values and black to achieve improved printer output color representations. The method includes the following steps. A first balanced set of primary printer color combinations (e.g., CMY) is initially derived which provides a balanced gray representation at various levels of primary color concentration. A second balanced set of primary printer color combinations (e.g., CMYK) is derived which provides a balanced gray representation at various levels of color concentration. Next, a set of primary printer colors (CMY) with K is derived, using the first balanced set, which best represents shadow colors, and a maximum color value is chosen therefrom. Then, a similar set of primary printer colors is calculated which best represents highlight values, by interpolating from the chosen maximum color value to a white value. CMYK color values are then determined, using the second set, shadow colors and highlight colors, which represent regions between black, white and maximum color points already found. Next, a color separation action is performed wherein input primary color values are matched, by interpolation, to closest primary printer color values and black that have been derived above. Thereafter, the stored values are utilized to populate a table which enables conversion of input primary printer color values (e.g., CMY) to combinations of such values with black (CMYK) for use during rendering by a printer.

6 Claims, 8 Drawing Sheets

PRINTER COLOR GAMUT OPTIMIZATION METHOD

FIELD OF THE INVENTION

This invention relates to a method for optimizing color images that are output by a color printer and, more particularly, to a method for determining optimum shadow and brightness colors, while utilizing ink/toner amounts that are no greater than a predefined threshold value.

BACKGROUND OF THE INVENTION

Laser driven color printers and copiers employ transparent toners which enable light to reflect off the page and to be directed back towards the eye. In general, such devices employs Cyan (C), Magenta (M) and Yellow (Y) toners as the principal component colors, from which other colors are created. Light passing through CMY toners has part of its color filtered out or absorbed by the toner such that the reflected light takes on the color of the toners that it passes through. In laser printers (and some copiers), a black (K) toner is used which is opaque to light. If a K toner is overprinted onto CMY to achieve darker colors, such as found in shadows, much of the colorfulness of the shadows is lost. Using K toner exclusively to achieve dark colors also results in much less colorful dark colors because less surrounding colorant is used.

Thus, to increase the range of colors available from a printer/copier, it is necessary to find a correct balance of K and CMY toners to produce dark colors, while allowing the dark colors to remain as colorful as possible.

While the prior art has employed combinations of the three primary colors cyan, magenta and yellow (CMY) to produce darker colors ranging to black, the need to deposit 100% density toner layers for each color causes an excessive amount of toner to be deposited on the media sheet (e.g. up to 300%). Such a high level of toner deposition does not fuse well and, in general, creates unsatisfactory images. Accordingly, prior art printing procedures have utilized combinations of K and CMY toners to achieve dark or shadowed color images.

When a printer receives image data from a host processor, the data is received in the form of either RGB or CMY values. In either case, the received values are converted to CMYK values in order to achieve desired levels of color representation on the final printed document. Such conversion, depending upon the color value parameters that are set by the printer manufacturer, can result in variable color representations when printers of different manufacturers are coupled to a host processor.

Accordingly, it is an object of this invention to provide an improved method for converting primary printer color values to combinations of the primary printer color values with black to achieve improved printer output color representations.

It is another object of this invention to provide an improved method for converting CMY to CMYK, while retaining a maximum gamut of available colors.

It is a further object of this invention to provide an improved method for converting CMY to CMYK, while maintaining toner quantities within determined limits.

SUMMARY OF THE INVENTION

The method of the invention provides an improved method for converting primary printer color values to combinations of the primary printer color values and black to achieve improved printer output color representations.

The method includes the following steps. A first balanced set of primary printer color combinations (e.g., CMY) is initially derived which provides a balanced gray representation at various levels of primary color concentration. A second balanced set of primary printer color combinations (e.g., CMYK) is derived which provides a balanced gray representation at various levels of color concentration. Next, a set of primary printer colors (CMY) with K is derived, using the first balanced set, which best represent shadow colors and a maximum color value is chosen therefrom. then, a similar set of primary printer colors is calculated which best represent highlight values, by interpolating from the chosen maximum color value to a white value. CMYK color values are then determined, using the second set, shadow colors and highlight colors, which represent regions between black, white and maximum color points already found. Next, a color separation action is performed wherein input primary color values are matched, by interpolation, to closest primary printer color values and black that have been derived above. Thereafter, the stored values are utilized to populate a table which enables conversion of input primary printer color values (e.g., CMY) to combinations of such values with black (CMYK) for use during rendering by a printer.

DETAILED DESCRIPTION OF THE INVENTION

Prior to describing the invention, a number of terms to be used hereafter will be defined.

"Hue" defines a visual sensation according to which an area appears to be similar to one of a set of primary colors or to a combination of two of the primary colors.

"Lightness" (or luminance) refers to the brightness of an area that is judged relative to the brightness of a similarly illuminated area that appears to be white or highly transmitting.

"Chroma" relates to the colorfulness of an area.

Figure 1A:
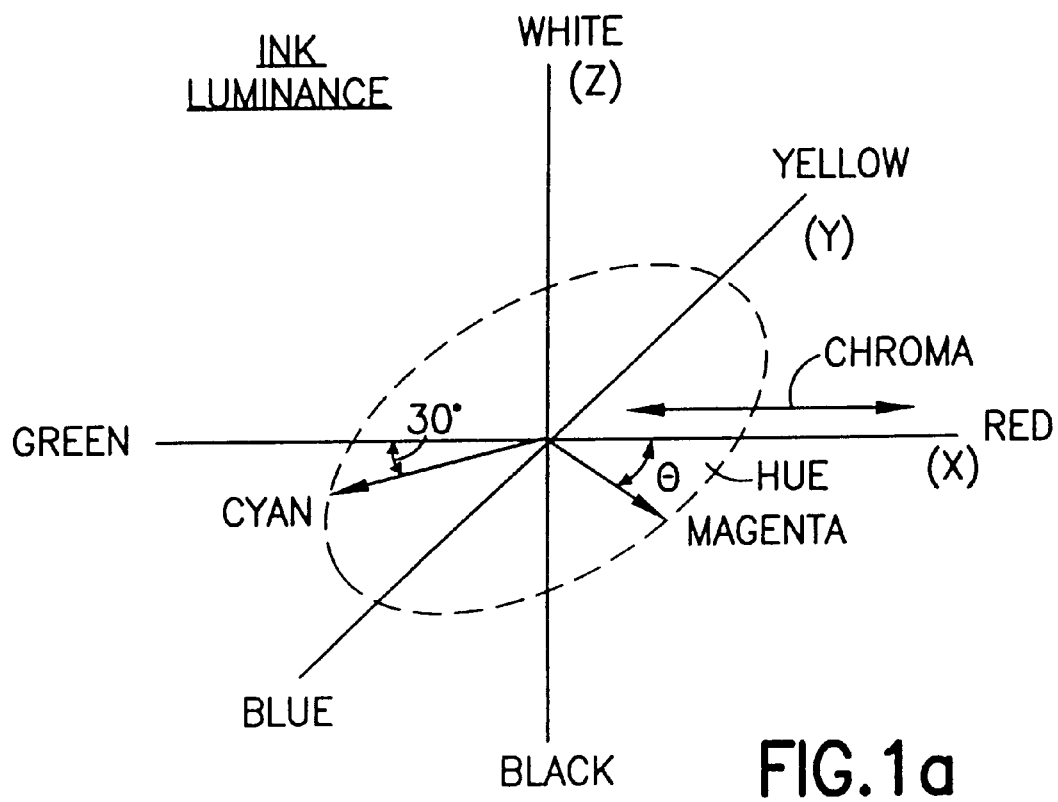
FIG. 1a is a Cartesian coordinate system in hue (H), ink (I), and chroma (C) color space which defines certain terms used herein.

FIG. 1a illustrates a printer color space which is a three-dimensional mathematical representation of the colors that the printer can create. The three orthogonal axes represent orthogonal (i.e., primary) colors. The amount of Ink (Lightness) is represented as a measure along the Z axis; chroma is represented as a value indicative of the strength or weakness of a color, plotted along a corresponding axis falling in the XY plane; and hue is defined by an angle (theta) of a vector which is indicative of a particular color (as defined by the ratio of primary inks)

Along the Ink Z axis, the luminance values vary from white to black. The representation shown in FIG. 1a is accordingly called (for the purposes of this description) the HIC color space.

Device color space is a three or four dimensional mathematical representation of all possible combinations of three or four primary inks/toners, either CMY or CMY and K. Hereafter, the term, toner, will be used to encompass both ink and toner. In a device color space, each axis or basis vector represents an amount of toner, starting at the origin with zero as its value and moving outward until a maximum value is reached, i.e., either 1.0 or 255, depending upon the current usage. Each axis represents a primary toner color and all combinations of toner amounts are represented in the device color space.

Theoretically, equal amounts of toner should produce colors that are perceived by an observer to be neutral (gray) in color or to have no colorfulness. The loci of points that have coordinates of equal values of component colors is defined to be the neutral axis of the device color space. Perceptually, the device color space is expected to go from one extreme of lightness to the other (i.e., white to black or vice versa) without any perceivable colorfulness. As indicated above, most toners do not produce neutral colors when equal amounts of toner are applied to the page.

In host processors, colors are specified for display on monitors as varying amounts of red, green and blue (RGB). Printers use a different colorant set composed of Cyan, Magenta, Yellow and Black toners. Translating RGB color values into CMY color values can be accomplished by formulas of varying complexity, the most simple being C=1-R; M=1-G; and Y=1-B. Black can be produced by equal amounts of CMY. If the darkest black is required, and the printer uses CMY to create the black color, then 300% toner will need to be deposited on the paper (i.e., 100% density quantities of each of the three primary colors). Under such circumstance, as indicated above, toner can run off the page or may not fuse properly to the page. Further, since CMY toners are transparent, the blackest black may not be obtainable using only CMY toners.

When K toner is used to create black, little, if any, CMY needs to be used, resulting in a savings in toner. Determining the amount of K toner to use and how much CMY not to use when creating black, is termed "color separation". Further, determining how much K toner to use to replace equal amounts of CMY toner is called "gray component replacement" or GCR. For any CMY color, when all of the component colors take the value of the minimum color component (i.e., of C, M or Y), the result is called the "gray component".

Figure 1B:
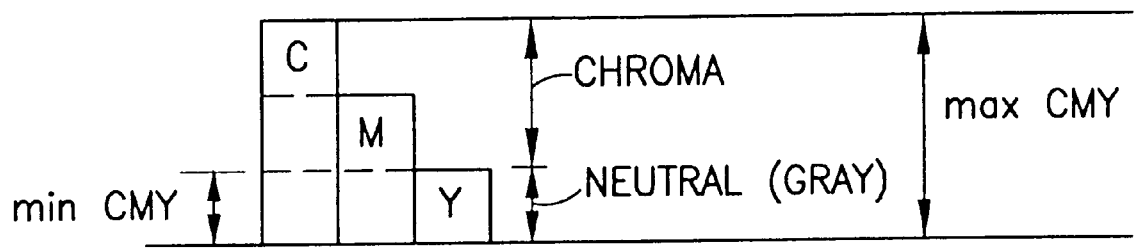
FIG. 1b is a chart of CMY colors that illustrates further terms used herein.

In FIG. 1b, amounts of C, M and Y toners that comprise a particular color are shown as bars along a horizontal axis. When C and M amounts are equal to the Y amount, the result is a neutral or gray component. The gray component is also defined as the "undercolor" and is the minimum amount of C, M and Y found in any CMY color. The percentage of under color that is removed when K toner is used, instead, is called under color removal (UCR) and is usually a number from 0–1 or a percentage from 0 to 100% That amount is also hereinafter referred to as "minCMY". A value "maxCMY" designates the amount or percentage of the maximum value component color of the overall toner combination. The amount of toner falling between the minCMY gray level and the maxCMY value is termed the chroma color, and comprises the colors required to render a particular hue.

Using the above-defined terms, the color separation algorithm of the invention will now be described. In brief, the algorithm maximizes the color gamut (range of perceived colors that a printer can print) and gray balances the neutral color axis, while staying within the maximum toner constraints of the printer. As will be hereafter understood, it is preferred that a reference color space be used that comprises a cylindrical coordinate system, wherein Hue (H), Ink (I) and Chroma (C) make up the reference coordinates (HIC). The HIC color space is conceptually easier to work with because a CMY color can be represented by hue (H), the total amount of toner (I) and the amount of toner that contributes to the colorfulness or chroma (C). All three of the parameters must be controlled to optimize the color gamut, while obeying the maximum toner limitation of the printer.

To achieve a balanced neutral color axis, color samples are printed (and spectrophotometrically measured) that are near the calculated neutral axis of the color space (i.e., all CMY component values equal). The measured color sample values are used to determine CMYK values which produce grays that are neutral, i.e., have no color.

Samples are then printed using colors that extend from full color (i.e., the most colorful red) to black. The samples are printed for all hues (red, orange, yellow, lime, green, aqua, cyan, sky, blue, violet, magenta and fuscia). Different values of undercolor removal and gray component replacement are used to produce the samples. The samples are then spectrophotometrically measured and the CMYK values that produce the most colorful colors, transitioning from a target color to black, are selected.

Thereafter, a highlight color vector is determined by interpolating color values from the previously determined most colorful color to the white point to provide a complete data set.

Next, interpolation is used to fill in interior CMYK color data. A final color separation interpolation table is then created, using the HIC color space. CMY values are translated to HIC color space and corresponding values for C, M, Y and K are then associated with the HIC values by a three-dimensional interpolation using previously obtained CMYK hue values.

The method for converting from CMY to HIC coordinates is as follows:

Calculating the total toner:

I=1−(1−maxCMY+maxRGB)/2

Calculating the chroma toner:

C=maxCMY−1+maxRGB

Calculating the hue angle:

The toner levels that contribute to color are first determined. The assumption is made that equal amounts of CMY produce neutral gray colors. Therefore, equal amounts of CMY are first subtracted from the input CMY color.

$C_c = C_i - min(CMY)$ $M_c = Y_i - min(CMY)$ $Y_c = Y_i - min(CMY)$

The components are then normalized:

$vC_c = C_c/max(CMY_c)$ $vM_c = Y_c/max(CMY_c)$ $vY_c = Y_c/max(CMY_c)$

Next Cartesian coordinates are extracted from the component sectors by assigning the yellow vector to lie along the positive y-axis, the magenta vector to lie along the vector −30 degrees from the positive x-axis and the cyan vector to lie along a vector +30 degrees from the negative x-axis.

The resulting Cartesian vector V is:

$V = ax + by$ $a = (\sqrt{3})(vM_c + vC_c)/2;$ and $b = vY_c − (vC_c + vM_c)/2$

The hue angle is calculated by:

$H = \arctan(b/a)$

Figure 2:
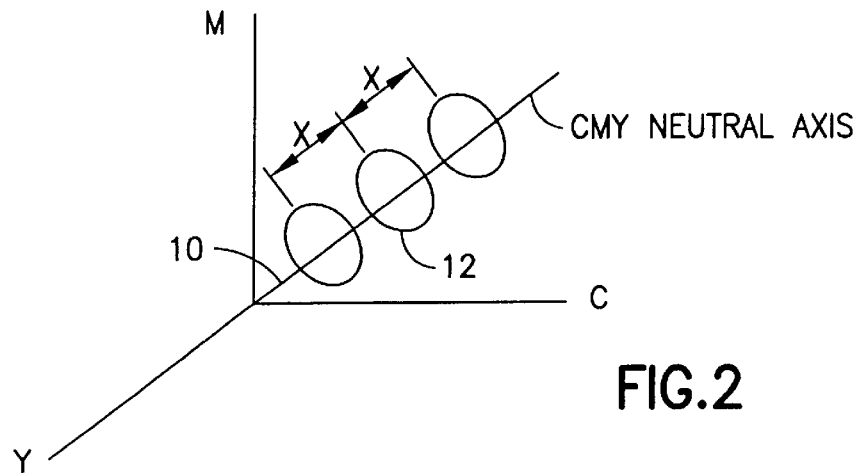
FIG. 2 is a plot of CMY color space showing plural CMY slices that are used in deriving a neutral color axis (i.e., gray axis).
Figure 3:
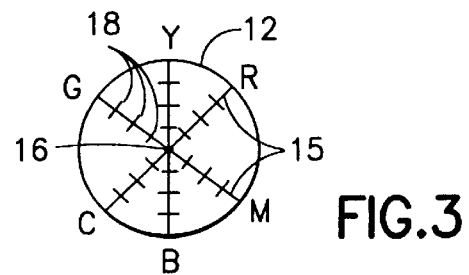
FIG. 3 is a chart which schematically illustrates a slice and the data points that are chosen in arriving at the balanced neutral gray axis.
Figure 4:
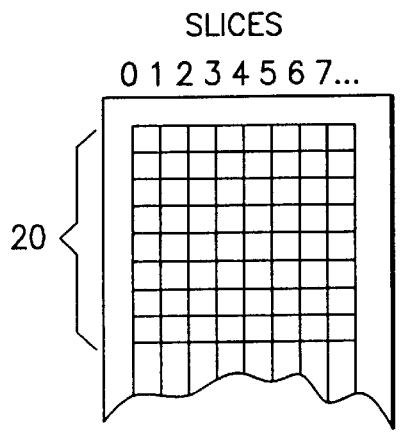
FIG. 4 is a schematic illustration of a page which is printed using the CMY values illustrated in FIG. 3.
Figure 7A:
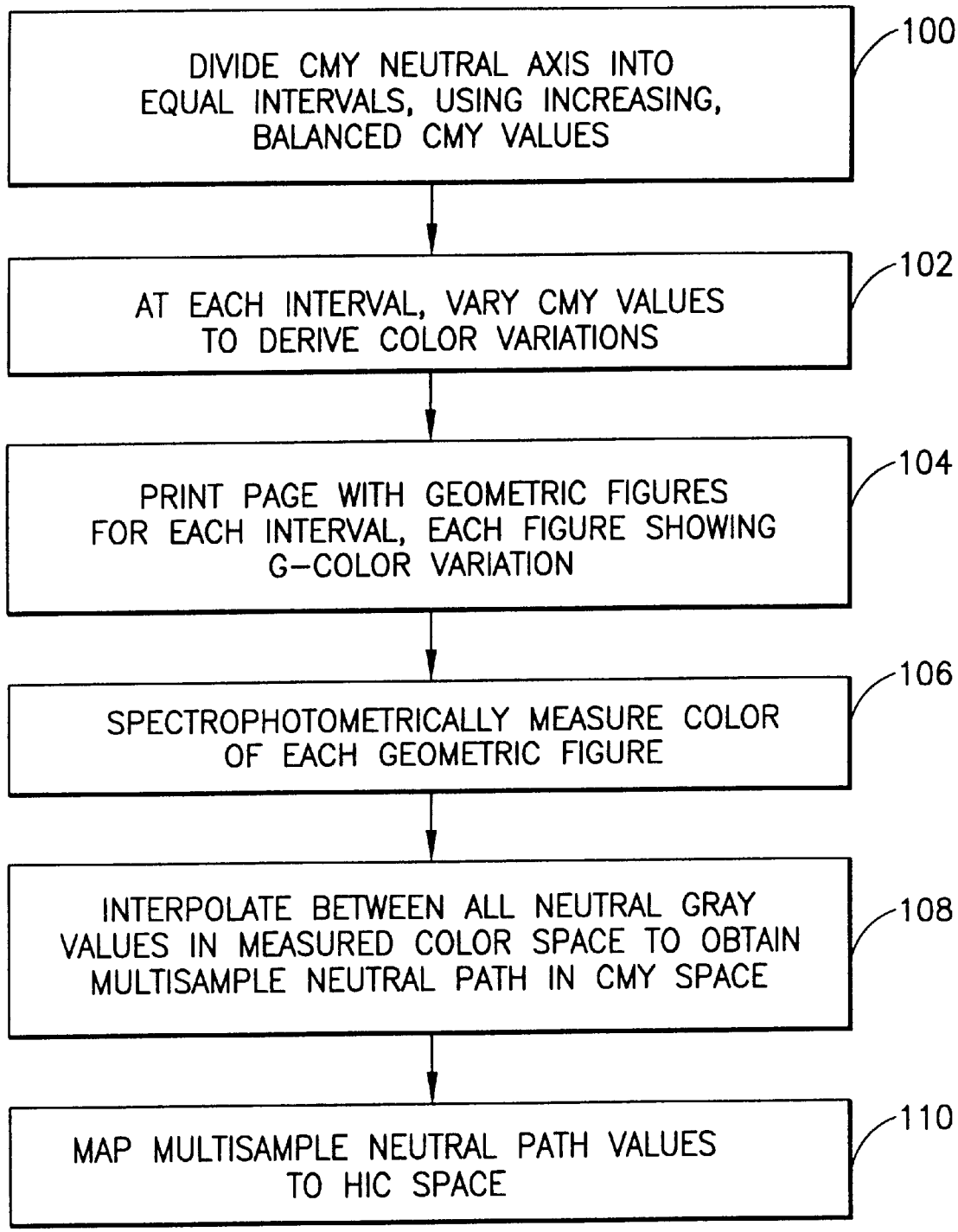
FIG. 7a is a logic flow diagram illustrating the method of the invention which achieves a three component balanced neutral gray vector.

Referring now to FIG. 7a, in conjunction with FIGS. 2–4, the procedure for deriving a neutral axis gray balanced vector will be described. FIG. 2 illustrates a CMY coordinate system wherein axis 10 represents equal values of C, M and Y. However, as described above, such equal values do not produce, necessarily, a neutral gray color. Accordingly, it is necessary to derive CMY values which will produce neutral gray values. Such values are achieved by dividing CMY neutral axis 10 into equal intervals, each interval defined by increasing balanced values of C, M and Y (see FIG. 7a, step 100).

At each interval, a "slice" 12 is created that is orthogonal to neutral axis 10. A schematic of a slice 12 is shown in FIG. 3 and comprises a plurality of "spokes" 15 which intersect at a central color sample 16, produced by equal C, M and Y values. A plurality of independently varied data points 18 are positioned on each spoke 15 and are achieved by varying the respective C, M and Y values to derive variations of color from CMY neutral axis 10. It is preferred that three data points 18 be selected on each spoke 15, each with slightly increasing color, where the interval between the data points are selected as a percentage of the color value for that slice (e.g., 3%). Accordingly, for each slice, eighteen color values, as well as the central neutral color value are generated (step 102, FIG. 7a).

Thereafter (see FIG. 4), a page is printed, showing for slices 1–n, the included C, M and Y color values in the form of small geometric FIGS. 20 (e.g. squares), each square 20 being colored in accordance with a specific CMY value (step 104). A representation of the page is shown in FIG. 4. It is to be noted that that page is initially created without use of any K toner, so that a series of balanced CMY neutral gray values can be determined.

Figure 5:
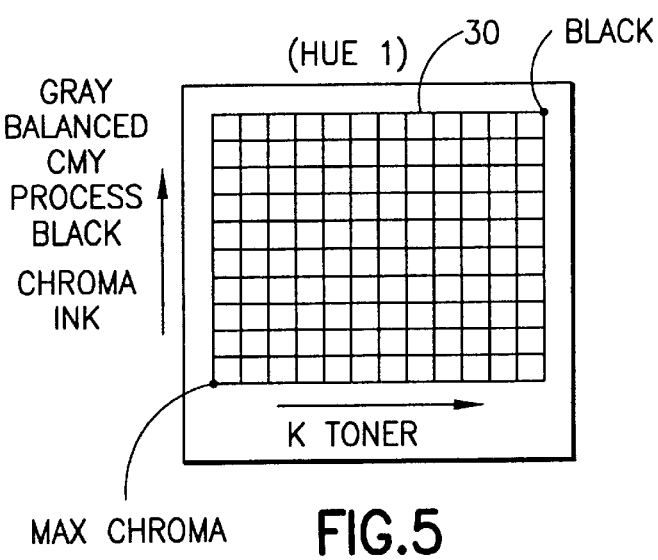
FIG. 5 is a schematic illustration of a printed page that is utilized during the derivation of shadow colors, wherein the vertical axis illustrates increasing ratios of three component, neutral, gray-balanced CMY process black to CMY chroma colors, and the horizontal axis illustrates increasing levels of K toner.

Then, each square 20 on the printed page is measured with a spectrophotometer (step 106, FIG. 7a). Using the measured values (i.e., luminance, chroma and hue), an interpolation is performed to find a perceptual neutral-balanced gray value vector (step 108). Thereafter, the LCH values which fall along the vector are converted to CMY values, using an inverse interpolation procedure which creates new CMY values that correspond to points along the vector. The CMY values are then mapped to HIC color space (step 110). The three component neutral axis vector values will be used when deriving maximized shadow colors, to be discussed below in regards to FIG. 5 and steps 112 et seq.

Figure 6:
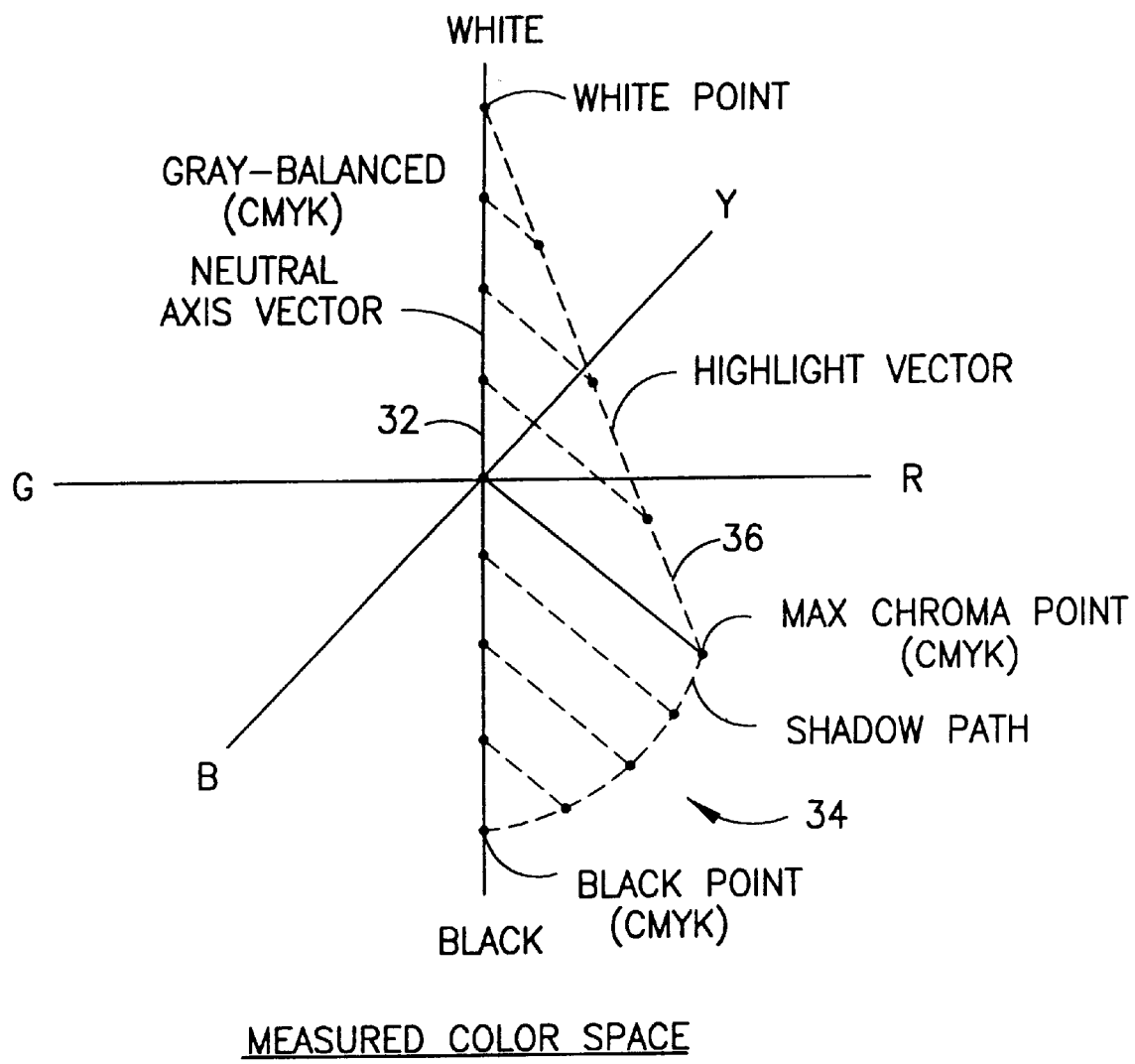
FIG. 6 is a Cartesian coordinate system in color space illustrating derived white, black and maximum chroma values for a given hue, which values are utilized in the derivation of a CMY to CMYK color conversion table.
Figure 7B:
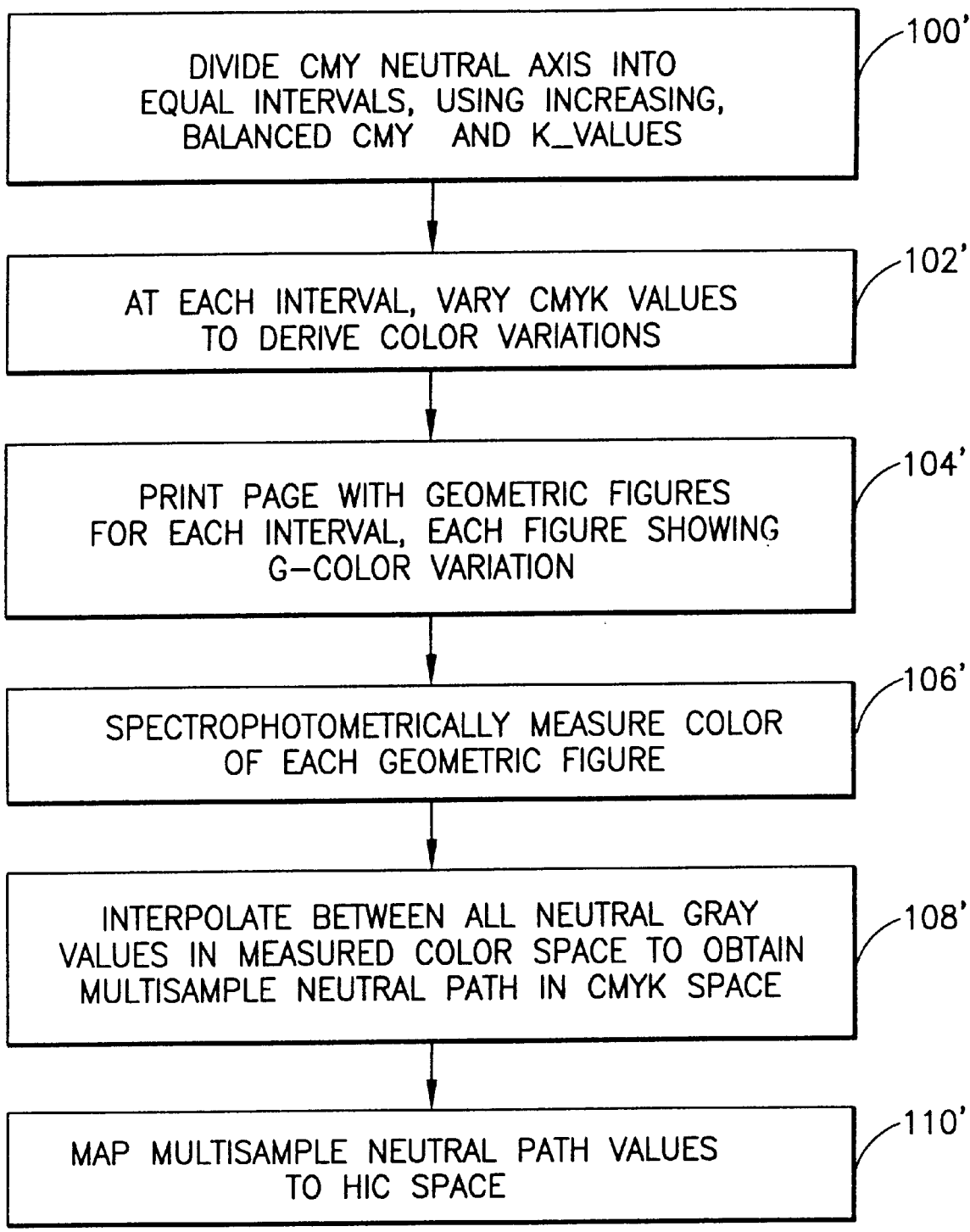
FIG. 7b is a logic flow diagram illustrating the method of the invention which achieves a four component balanced neutral gray axis.

Turning to FIG. 7b, the steps shown in FIG. 7a are repeated as steps 100'–110', but with increasing amounts of K toner added to the CMY balanced gray values for each slice. The amount of K toner is increased for each succeeding slice. These steps result in a gray-balanced neutral axis which varies from white to black and is neutral axis vector 32 shown in FIG. 6.

The next procedure involves the maximization of shadow colors and utilizes both CMY and K color values and the CMY color values for the three component neutral axis vector values derived in steps 100–108. The goal of the maximizing procedure is, for any given hue, to determine what level of gray component removal and undercolor removal is to be used to transition from a maximum chroma point (a most colorful point) to a black point.

Figure 8A:
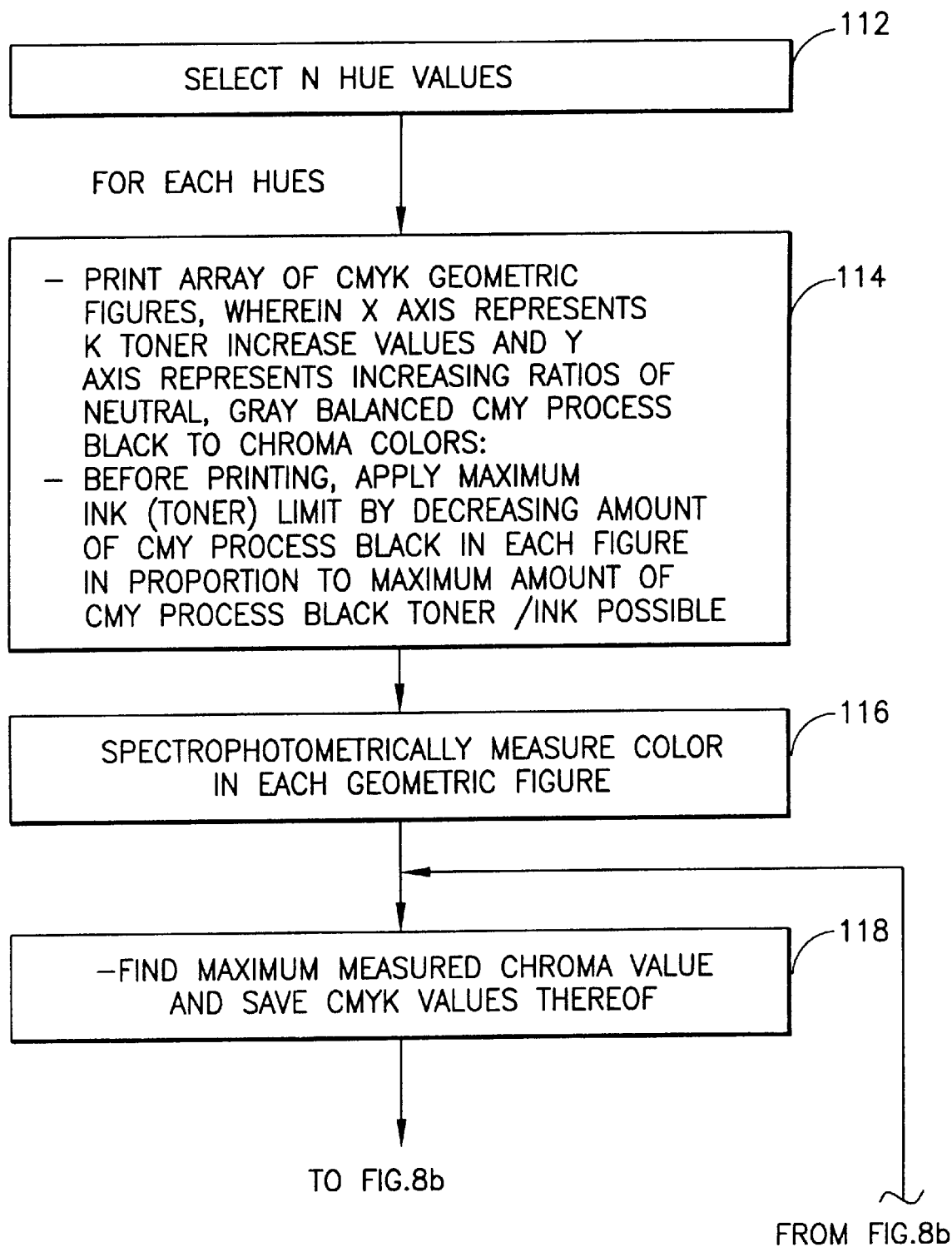
FIGS. 8a and 8b is logic flow diagram of the method of the invention that is utilized to maximize shadow colors.
Figure 8B:
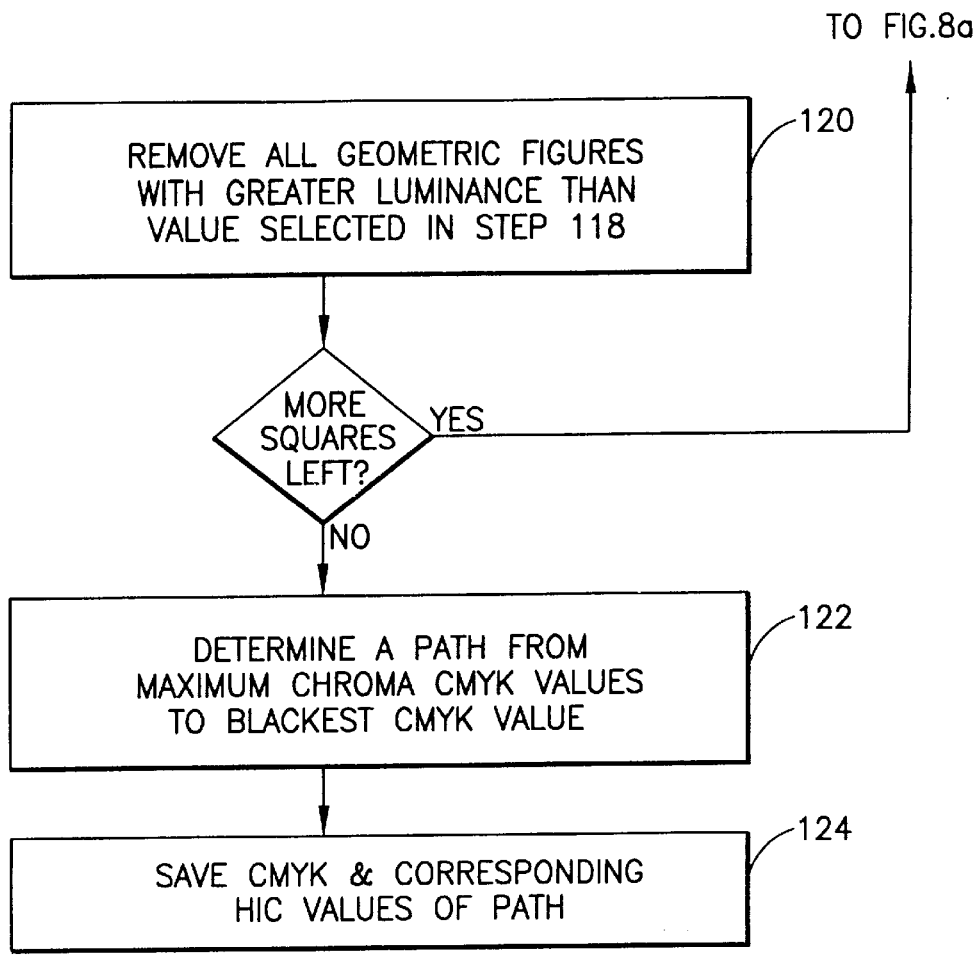

Initially, a plurality of N hue values are selected (step 112, FIG. 8a). The number of hues selected is arbitrary, but must provide enough resolution to minimize interpolation artifacts between hues later in the procedure. It is preferred that at least 12 equally spaced hues be selected (e.g. from 0–360° in the XY plane shown in FIG. 1a).

For each selected hue, a two-dimensional array 30 of CMYK colored geometric figures is created (see FIG. 5), with the color values selected to maintain the same hue. Along the X axis of the array, the K toner level is increased from 0–100% and along the Y axis of the array, the colors of the geometric figures evidence an increasing ratio of CMY process black (i.e., gray balanced amounts of the three component, CMY toners determined in steps 100–110) to the chroma toners. Each of the squares shown in FIG. 5 evidences a color in accordance with the specific ratio of CMY process black to chroma toner and K toner amount.

Before array 30 is printed, a maximum toner limit of the printer is applied. The maximum toner limit is the amount of toner which can be handled by the printer so as to achieve an acceptable print quality (step 114, FIG. 8a). More specifically, the maximum toner limit is applied by decreasing the amount of CMY process black toner in any given square, in proportion to the maximum amount of CMY toner that is possible. For example, if it is assumed that the maximum CMY process black toner is 300% and the maximum toner limit for a printer is 100%, then the amount of CMY process black toner may be reduced by (i) a linear function, e.g., ⅔ or (ii) a non-linear function, to shift most of the ink reduction into the darker colors. The same function is then applied to lesser values of CMY process black so that the toner quantities in each square are reduced in the same proportion.

Next, array 30 is printed and (see step 116) each square is subjected to a spectrophotometric analysis. The derived color values are then analyzed to determine which square evidences a maximum chroma value (i.e., a step near the lower left-hand corner of array 30) and the CMY and K values for the step are saved, as well as corresponding HIC values (step 118). Thereafter, any square having a greater luminance value than the maximum chroma value step is eliminated, as only darker colors are of interest in this portion of the procedure (step 120). Until there are no more squares left (decision step 121), the process repeats steps 118 and 120 until all maximum CMYK chroma values have been determined and stored.

Next (step 122), a path is determined from the square evidencing the maximum CMYK chroma value to a square evidencing a blackest CMYK color value (generally the square in the upper right hand corner of array 30) using all of the intermediate selected color values. The saved CMYK values are used to derive further CMYK color values which combine to describe the path (by interpolation of points from the square evidencing the maximum chroma value to the square evidencing the darkest black value). After averaging, to smooth discontinuities, the CMYK and corresponding HIC coordinate values for the derived path, are saved (step 124).

Figure 9:
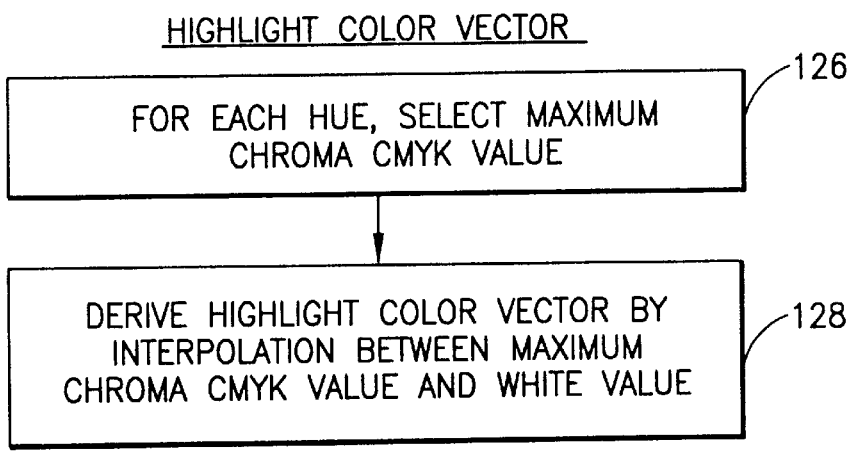
FIG. 9 is a logical flow diagram of the method of the invention which illustrates steps utilized in achieving highlight colors.

Turning to FIG. 9, the next step in the procedure is to determine a vector of highlight color values from the maximum chroma value, as determined above, to white (where CMYK=0). The highlight vector derivation is performed for each hue, by accessing the CMYK color values of the maximum chroma value square determined above (step 126). The highlight color vector is then derived by interpolating a plurality of CMYK color values between the maximum chroma value and the white (step 128).

Figure 10:
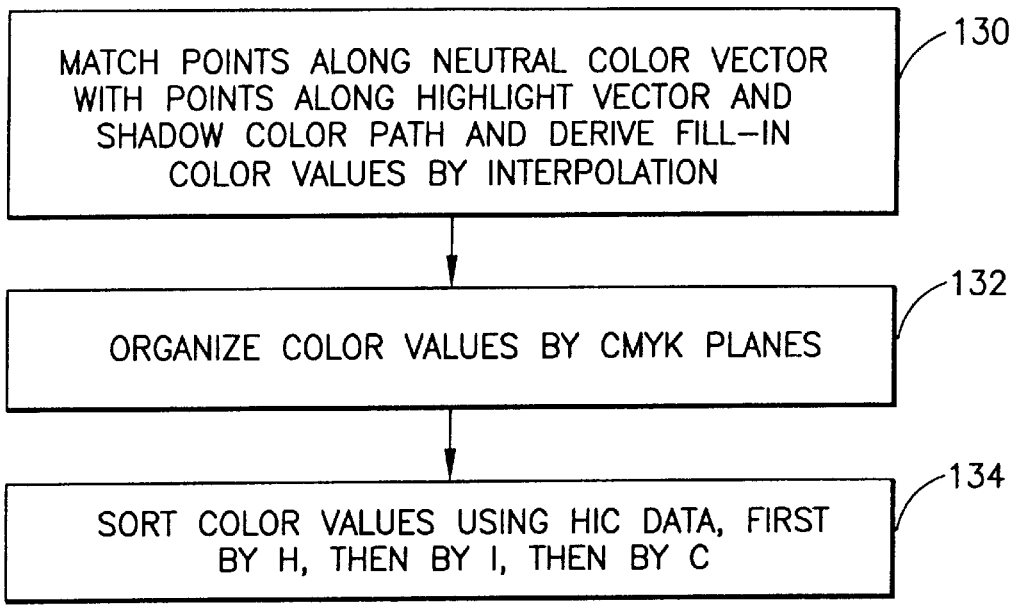
FIG. 10 is a logic flow diagram illustrating the derivation of fill-in colors.

At this stage, referring to FIG. 6, a neutral axis (gray) vector 32, a shadow color vector 34 and a highlight color vector 36 have been derived for each of a plurality of hues (FIG. 6 shows only the vectors for a single hue). Now it is necessary to fill in color values between the vectors. As shown in FIG. 10, points along neutral axis vector 32 are matched to points along shadow color vector 34 and highlight color vector 36 (step 130). Then, color values are derived between the matching points by interpolation. Next (step 132), all of the derived color values are organized by C, M, Y and K plane data. Each plane is then sorted (step 134) using corresponding HIC color data, first by H, then by I and then by C. The color separation data is now saved for subsequent use in the color separation function to be described immediately below.

Figure 11:
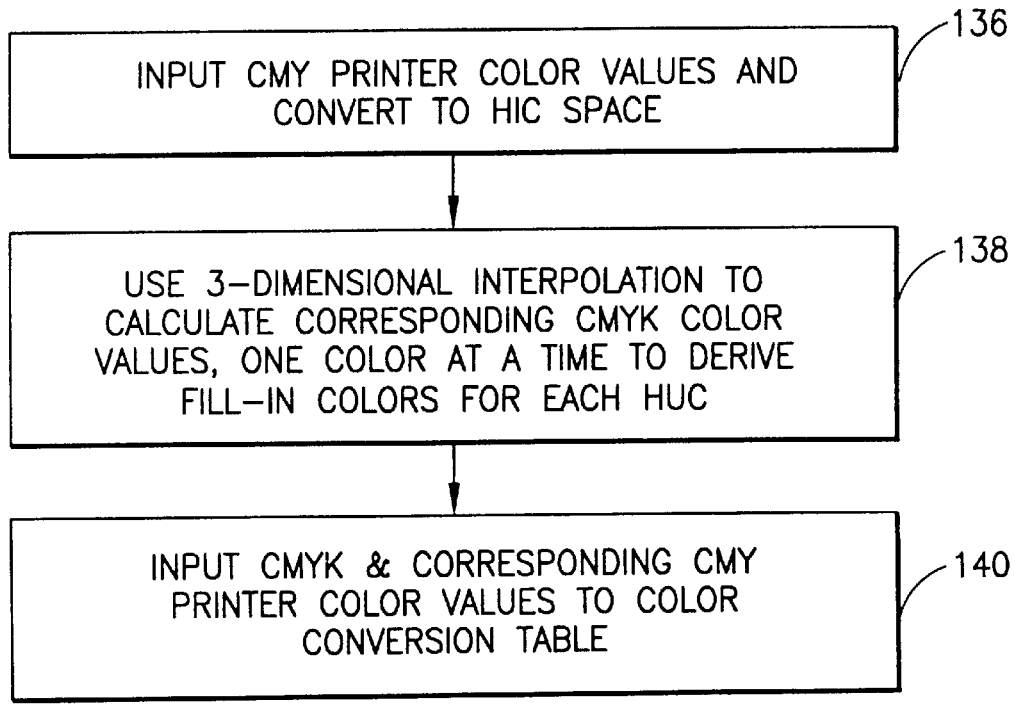
FIG. 11 is a logical flow diagram illustrating a color separation method which enables derivation of a CMY to CMYK conversion table.

Color separation is accomplished (see FIG. 11) by inputting CMY printer color values and first converting each inputted CMY value to HIC color space (step 136). Next, the resulting HIC coordinates for each CMY color are utilized to extract CMY and K toner values from the color separation data, one color at a time. As an input CMY color value will rarely match the derived CMYK color values, a tri-linear interpolation is used to extract each color value by interpolating from the three nearest corresponding CMYK values (step 138). Thereafter, the calculated color values are then input to a conversion table (step 140) which is then utilized in converting CMY printer color input values to CMYK values.

As can be seen, the invention enables a conversion table to be created which provides for both gray component replacement and under color removal, when K toner is utilized. Further, the invention takes into consideration the maximum quantities of toner which a printer can accommodate, thereby allowing optimal color presentations.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

We claim:

1. A method for determining amounts of black to be used with mixtures of first, second and third primary printer colors to represent a given hue, said method comprising the steps of:
    a) determining a range of gray levels by
        i) printing plural sets of colored geometric figures, each set evidencing a different lightness from a previous set and comprised of combinations of said first, second and third primary printer colors and black, in amounts which vary from equal to incremental differences from equal;
        ii) measuring each set to derive measured color values;
        iii) using interpolation between the measured values to derive a gray vector; and
        iv) deriving new combinations of said first, second and third primary printer colors and black which define said gray vector;
    b) maximizing shadow colors by
        i) printing plural sets of colored geometric figures, each set evidencing a different hue from a previous set and comprised of varying combinations of said first, second and third primary printer colors and varying amounts of black;
        ii) deriving spectrally measured values for each geometric figure and selecting one geometric figure whose measured spectral values evidence a maximum chroma value for each hue, a second geometric figure whose measured spectral values evidence a darkest black for each hue, and plural geometric figures having intermediate levels of maximum chroma values and minimized lightness;
        iii) deriving a shadow path for each hue comprising plural hue printer color values, by interpolation between said maximum chroma value, said darkest black for said hue and said intermediate levels of maximum chroma values and minimized lightness, all as determined from said measured spectral values;
    c) deriving a highlight color vector for each hue by interpolation between said maximum chroma value and a white color value;
    d) determining combinations of primary printer color values and black values for points lying between said gray vector, said shadow path and said highlight color vector so as to create a hue plane for each said hue; and
    e) creating a conversion table wherein input combinations of said first, second and third primary printer color values are mapped to output combinations of first, second and third primary printer color values and black values, said mapping created by consideration of color values of each said input combination and first, second and third primary printer color values and black values comprising one or more nearest hue planes.

2. The method as recited in claim 1, wherein each set of color geometric figures printed by step b(i) evidences a two dimensional array of geometric figures, with the geometric figures arranged in accordance with one axis of said array evidencing increasing black contents and a second axis of said array evidencing increasing amounts of said first, second and third primary printer colors that comprise process black.

3. The method as recited in claim 2, wherein an amount of said first, second and third primary printer colors used to produce a geometric figure is no greater than a maximum ink or toner limit.

4. The method as recited in claim 3, wherein said amount of said first, second and third primary printer colors in each geometric figure is reduced in proportion to a function of (i) said maximum ink or toner limit, and (ii) a greatest amount of ink or toner comprising said first, second and third primary printer colors, wherein said function is either linear or non-linear.

5. The method as recited in claim 1, wherein step c derives said highlight color vector by interpolating between a combination of primary printer color values and a black value which gives rise to said maximum chroma value and a combination of primary printer color values and a black value which gives rise to a white value.

6. The method as recited in claim 1, wherein said primary colors are cyan, magenta and yellow.

* * * * *